N. C. DOSS.
COMPRESSION INNER TUBE.
APPLICATION FILED MAY 28, 1918.
1,295,011.
Patented Feb. 18, 1919.
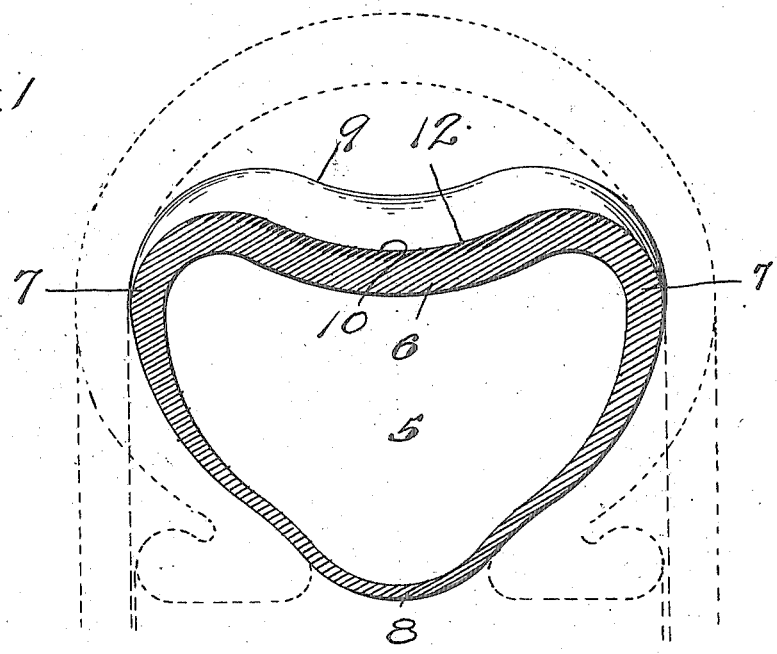
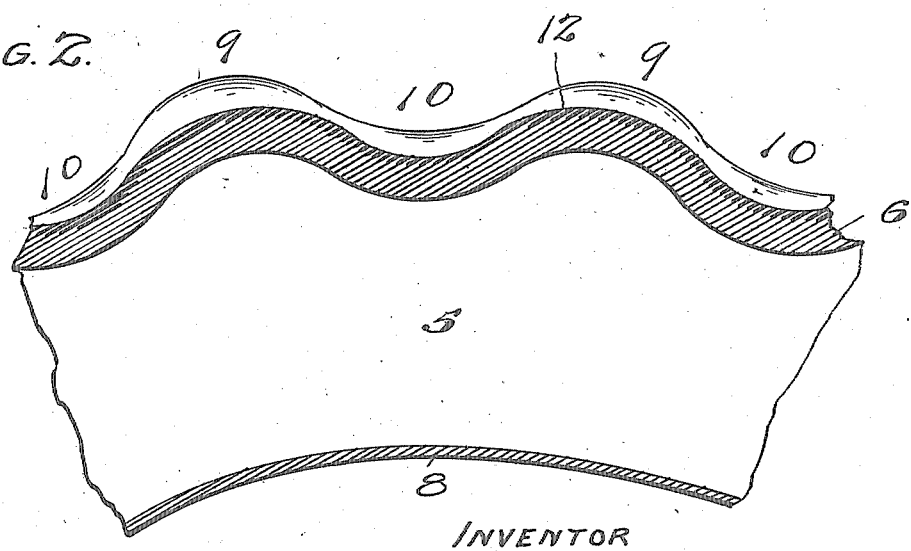
INVENTOR
NOBLE C. DOSS
ATTORNEY ically raised and depressed portions extend for substantially the entire width of the tread portion of the tube.

UNITED STATES PATENT OFFICE.

NOBLE C. DOSS, OF ATLANTA, GEORGIA, ASSIGNOR TO THE DOSS RUBBER AND TUBE COMPANY, OF ATLANTA, GEORGIA, A CORPORATION OF GEORGIA.

COMPRESSION INNER TUBE.

1,295,011.  Specification of Letters Patent.  Patented Feb. 18, 1919.

Application filed May 28, 1918. Serial No. 236,991.

*To all whom it may concern:*

Be it known that I, NOBLE C. DOSS, a citizen of the United States, residing at Atlanta, in the county of Fulton and State of Georgia, have invented certain new and useful Improvements in Compression Inner Tubes, of which the following is a specification.

My invention relates to improvements in compression inner tubes for double tube tires.

An important object of the invention is to provide a tube of the above mentioned character, the tread portion of which is so constructed that it will not leak when punctured, while the inner protected portion is sufficiently elastic, so that the inner tube will be self-adjusting to fit within tire shoes or casings of slightly varying diameters.

A further object of the invention is to provide a tube of the above mentioned character, having the outer portion of the material of its tread portion, rendered somewhat less extensible or less elastic, thereby insuring the proper compression of the inner side of the tread portion of the tube, and causing the tube to stretch or expand at the portion thereof nearer the rim of the wheel.

Other objects and advantages of the invention will be apparent during the course of the following description.

In the accompanying drawings forming a part of this specification and in which like numerals are employed to designate like parts throughout the same, Figure 1 is a transverse sectional view through an inner tube embodying my invention, and Fig. 2 is a central longitudinal sectional view through the same, in the plane of rotation thereof.

My improved inner tube is designated as a whole by the numeral 5, and comprises a thickened tread portion 6, formed of readily compressible or relatively soft rubber, said thickened tread portion continuing to about the points 7, from which the material of the tube is reduced in thickness, providing an inner relatively thin portion 8, which is highly elastic or extensible.

The tread or thickened portion 6 is provided longitudinally thereof with alternately raised and depressed portions 9 and 10, which are curved longitudinally and transversely, as shown. These alternately raised and depressed portions extend for substantially the entire width of the tread portion of the tube.

To insure the proper compression of the inner portion of the tread portion 6 of the tube, the outer material 12 of such tread portion is suitably vulcanized or otherwise treated to render the same tougher, less extensible, or relatively non-extensible, thereby preventing the elastic portion of the tread portion from substantially yielding outwardly when unfolded or extended to the maximum degree, upon inflation. By this construction, should the inner tube be slightly smaller than its tire casing or shoe, the inner elastic portion 8 thereof will yield so that the inner tube will completely fill the tire casing, thereby allowing the tread portion to be placed under suitable compression.

By the provision of the alternately raised and depressed portions, the area of the tread portion of the tube, in the plane of rotation, is increased, whereby such tread portion will be compressed, when inflated. Should this tread portion, while under compression, be punctured, by a nail or the like, the puncture or opening will at once close by virtue of the state of compression of the tread portion, thereby preventing the escape of air.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim is:—

1. A compression inner tube formed entirely of elastic and compressible rubber being free from fabric, the tube having its tread portion proper thickened and provided with alternate raised and depressed portions, and its side portions from the tread portion proper to the inner portion of the tube decreasing in thickness inwardly, said tread portion proper having its material treated to render the same nonextensible.

2. A compression inner tube formed of elastic and compressible rubber, having its tread portion thickened and provided with alternate raised and depressed portions, the outer surface of the tread portion being vulcanized to render the tread portion relatively nonextensible, the sides of the tube from the tread portion to the inner portion thereof being reduced in thickness and highly elastic so that the stretch in the tube will occur entirely in these side portions.

3. A compression inner tube formed of elastic and compressible rubber, and having a tread portion provided with alternate raised and depressed portions, the outer surface of the tread portion being vulcanized to render the same relatively nonextensible.

In testimony whereof I affix my signature.

NOBLE C. DOSS.